Patented May 6, 1941

2,240,730

UNITED STATES PATENT OFFICE 2,240,730

SOLUTIONS OF POLYVINYL ALKYL KETONES AND A PROCESS OF POLYMERIZING VINYL ALKYL KETONES

Arthur Voss and Kurt Billig, Frankfort-on-the-Main, Germany, assignors, by mesne assignments, to General Aniline & Film Corporation, New York, N. Y., a corporation of Delaware No Drawing. Application May 14, 1938, Serial No. 207,910. In Germany May 18, 1937

11 Claims. (Cl. 260—32)

The present invention relates to solutions of polyvinyl alkyl ketones and to a process of polymerizing vinyl alkyl ketones.

By the polymerization of vinyl alkyl ketones, especially of polyvinyl methyl ketone, polymerization products are obtained which are soluble only in a limited number of solvents. Particularly they are not soluble in alcohol, that is in one of the most usual solvents, but only in ketones, esters, chlorinated hydrocarbons and some special solvents.

We have found that polymeric vinyl ketones are soluble in a mixture of water with alcohol. This could not be foreseen, as these polymeric substances are soluble neither in alcohol nor in water and as it seems to be a general rule that resinous bodies of a synthetic or natural origin which are soluble neither in alcohol nor in water and are more disposed to dissolve in less polar solvents are likewise not soluble in a mixture of alcohol and water. At best it is possible that polymeric substances which are insoluble in water but soluble in alcohol are still soluble in a mixture of alcohol and water, as for instance in the case of polyvinyl acetate. The surprising capacity of the polyvinyl alkyl ketones for being dissolved in this manner is of great industrial importance, since an essentially more economical application of the polyvinyl ketones than hitherto known is possible when a mixture of water and alcohol is used. Mixed polymerizates from vinyl alkyl ketones and other polymerizable unsaturated compounds may also be dissolved in a mixture of water and an alcohol.

Suitable alcohols for use in the invention are all monohydric alcohols which are readily miscible with water, such as methyl alcohol, ethyl alcohol, propyl alcohol; of polyhydric alcohols those may be used in which the hydroxyl groups are blocked except one, such as glycol monoether. These more complicated alcohols, however, are not very important for the invention, because the industrial progress particularly lies in the use of solvents permitting an especially economical working. The proportion generally may vary within wide limits. The proportion of alcohol to water may play a certain part if instead of polyvinyl ketones interpolymerization products of the vinyl ketone with other substances which polymerize in mixture, for instance other vinyl compounds, are used. Mixtures may, for instance, be used containing about 30 per cent. of alcohol and about 70 percent. of water. In most cases, however, mixtures will be used containing more alcohol than water; aqueous alcohols of about 50 per cent. strength to about 80 per cent. strength may suitably be used.

Furthermore, it has been found that solutions of polyvinyl ketones can also be obtained by polymerizing the monomeric vinyl ketone or the monomeric vinyl ketone together with another polymerizable unsaturated compound in the mixture of alcohol and water. This method has the advantage that it avoids any superpolymerization which may occur very readily in the case of vinyl ketones and leads to insoluble products, probably caused by the formation of cross-bonds between the chain-like molecules, so that clear and perfect solutions are always obtained which may be used in industry without difficulty for the manfacture of lacquers, impregnating agents, adhesives or the like. As polyvinyl ketones there may be named: polyvinyl methyl ketone and polyvinyl ethyl ketone; and as a component for use in preparing interpolymerization products: acrylic acid, acrylic acid ethyl ester, acrylic acid methyl ester, acrylic acid propyl ester, acrylic acid nitrile, styrene, vinyl ethyl ether, vinyl propyl ether, vinyl butyl ether.

The following examples serve to illustrate the invention, but they are not intended to limit it thereto; the parts are by weight:

1. 1 part of polyvinyl methyl ketone is stirred in a boiler with 9 parts of aqueous alcohol of 65 per cent strength, preferably at a raised temperature. After some time the polyvinyl methyl ketone has dissolved.

Instead of the aqueous alcohol an aqueous propanol may be used with the same good effect; aqueous methanol is less suitable.

The dissolution of suspensions or emulsions of the polyvinyl ketone occurs much more rapidly than that of the solid polyvinyl ketone. The emulsions may have any desired degree of dryness. The content of water of the alcohol may likewise vary within wide limits. There are obtained clear solutions which, when required of increased concentration in respect of the polymeric substance, are preferably produced at an elevated temperature.

2. A suspension or an emulsion of an interpolymerization product from vinyl methyl ketone and vinyl-n-butyl ether in the proportion of 3 parts of ketone to 1 part of ether is dissolved by the addition of a mixture of water and one of the lower alcohols. The dissolution occurs less easily than that of emulsions of the pure polyvinyl methyl ketones.

Instead of the interpolymerization products of vinyl methyl ketone with vinyl-n-butyl ether interpolymerization products with other vinyl ethers may be used and likewise interpolymerization products of vinyl methyl ketone with other unsaturated compounds capable of polymerizing, in which case the proportion of the components of the mixture may vary within wide limits.

3. A part of a solution of 100 parts of freshly distilled vinyl methyl ketone, 50 parts of aqueous ethyl alcohol of 70 per cent strength and 1 part of aqueous hydrogen peroxide of 30 per cent strength is introduced into a boiler provided with a reflux apparatus and is heated to 70° C. After the beginning of the polymerization the main quantity of the solution is slowly caused to flow in and then the temperature is further kept at 70° C. to 80° C. for several hours. A limpid solution of polyvinyl methyl ketone in aqueous alcohol is obtained which contains only a small quantity of non-polymerized vinyl methyl ketone and, when dried, yields a thin layer of a limpid viscous film. This solution, which still, if desired, may be freed, according to known methods, from monomeric substances not yet transformed, may be used without difficulty for various industrial purposes. Furthermore, it may readily be diluted with aqueous alcohol or with other solvents, such as acetone and glycol formal.

This process of polymerizing polyvinyl methyl ketone in aqueous alcohols may also be carried out continuously, by introducing the reaction mixture into a high, tubular apparatus, heated to the necessary temperature, and continuously removing the finished product at the bottom of the apparatus.

4. Similarly as described in Example 3, a mixture of 90 parts of vinyl methyl ketone, 10 parts of aqueous acrylic acid of 66 per cent strength and 1 part of aqueous hydrogen peroxide of 30 per cent strength is caused to react in 100 parts of alcohol. There is obtained a solution of the interpolymerization product of vinyl methyl ketone and acrylic acid which may readily be dissolved in aqueous ammonia. The proportion of ketone to acrylic acid may vary within wide limits.

5. Similarly as described in Examples 2 and 4, a mixture of 50 parts of vinyl methyl ketone, 50 parts of acrylic acid methyl ester, 1 part of aqueous hydrogen peroxide of 30 per cent strength and 100 parts of alcohol of 70 per cent strength is caused to react. A limpid solution of the interpolymerization product is formed.

The proportion of the two components of the mixture is not limited to that given above. Other esters of acrylic acid may be polymerized in a mixture as here described.

We claim:

1. Solutions of polyvinyl alkyl ketones in a mixture of water and an aliphatic monoalcohol miscible with water.

2. Solutions of polyvinyl methyl ketone in a mixture of water and an aliphatic monoalcohol miscible with water.

3. Solutions of polyvinyl methyl ketone in a mixture of methyl alcohol and water.

4. Solutions of polyvinyl methyl ketone in a mixture of ethyl alcohol and water.

5. Solutions of polyvinyl methyl ketone in a mixture of propyl alcohol and water.

6. The process which comprises polymerizing vinyl alkyl ketones in a mixture of an aliphatic monoalcohol and water containing from about 30 to about 80 per cent of the alcohol.

7. The process which comprises polymerizing vinyl methyl ketone in a mixture of an aliphatic mono-alcohol and water containing from about 30 to about 80 per cent of the alcohol.

8. The process which comprises polymerizing vinyl methyl ketone in a mixture of methyl alcohol and water containing from about 30 to about 80 per cent of the alcohol.

9. The process which comprises polymerizing vinyl methyl ketone in a mixture of ethyl alcohol and water containing from about 30 to about 80 per cent of the alcohol.

10. The process which comprises polymerizing vinyl methyl ketone in a mixture of propyl alcohol and water containing from about 30 to about 80 per cent of the alcohol.

11. Solutions of polyvinylmethyl ketone in a mixture of at most 70 per cent of water and at least 30 per cent of an aliphatic monoalcohol miscible with water.

ARTHUR VOSS.
KURT BILLIG.